(12) United States Patent
Azzam et al.

(10) Patent No.: US 6,974,904 B2
(45) Date of Patent: Dec. 13, 2005

(54) PORTABLE SOLAR POWERED UNIT

(75) Inventors: Moneer H. Azzam, Wellesley, MA (US); Graham Sayers, Fort Fairfield, ME (US)

(73) Assignee: Solar Dynamics, Inc., Simsbury, CT (US)

( * ) Notice: Subject to any disclaimer, the term of this patent is extended or adjusted under 35 U.S.C. 154(b) by 76 days.

(21) Appl. No.: 10/325,147

(22) Filed: Dec. 20, 2002

(65) Prior Publication Data

US 2004/0211457 A1 Oct. 28, 2004

Related U.S. Application Data (60) Provisional application No. 60/343,477, filed on Dec. 21, 2001.

(51) Int. Cl.[7] .................. H01L 31/042; H01L 31/048
(52) U.S. Cl. .................. 136/244; 136/251; 136/246; 136/245; 136/291; 280/63; 280/47.34; 280/47.35; 320/101

(58) Field of Search .................. 136/244, 251, 136/246, 291, 245; 280/63, 47.34, 47.35; 320/101

(56) References Cited

U.S. PATENT DOCUMENTS

| | | | | |
|---|---|---|---|---|
| 5,111,127 A | * | 5/1992 | Johnson | 320/101 |
| 6,201,181 B1 | * | 3/2001 | Azzam et al. | 136/244 |
| 6,396,239 B1 | * | 5/2002 | Benn et al. | 320/101 |
| 6,552,257 B1 | * | 4/2003 | Hart et al. | 136/246 |
| 2002/0175881 A1 | * | 11/2002 | Luoma et al. | 345/55 |

* cited by examiner

*Primary Examiner*—Alan Diamond
(74) *Attorney, Agent, or Firm*—McCormick, Paulding & Huber LLP

(57) ABSTRACT

A portable solar powered unit including a battery with associated electronics and a solar panel on a wheeled frame accommodates a variety of accessories including table tops, mounting poles, overhangs, back racks and a cover for all weather operation.

13 Claims, 9 Drawing Sheets

PORTABLE SOLAR POWERED UNIT

CROSS REFERENCE TO RELATED APPLICATIONS

This Application claims the benefit of provisional application 60/343,477, filed Dec. 21, 2001.

FIELD OF THE INVENTION

This invention relates in general to a portable solar powered unit and deals more particularly with a portable solar powered unit having increased structural flexibility and stability, as well as being more resistant to adverse environmental conditions.

BACKGROUND OF THE INVENTION

One of the principal drawbacks of known solar (photovoltaic—PV) powered units is the interface between a mounted solar PV module and the unit itself, as it relates to structural flexibility and stability. In general, known solar PV modules typically comprise an array of solar cells ganged together to provide the current and voltage output to a storage device or other electrical equipment, such as a converter. The solar modules may be configured with a carriage assembly for portability and remote operation.

Portability and remote operation of solar PV systems present several challenges, including the need to deliver a range of DC and AC voltages, frequencies and waveforms over widely divergent climate and weather conditions.

Another challenge in the solar-photovoltaic industry is that there is no standard size, shape and construction of solar PV modules. This variability typically has constrained users of solar modules to a single type or manufacturer of solar PV modules and limits opportunities to improve cost or performance for packaged systems. Moreover, the prior art devices were not adapted to readily receive multiple solar panels.

Compactness, stability and ease of assembly in the field are highly desirable for operation in remote locations. Prior art units, however, are often bulky or difficult to assemble. A design constraint for the carriage assembly is that it must be adapted to receive a storage device, such as a battery, which typically is quite massive when compared to the rest of the equipment or apparatus, which comprises the assembly. Prior art systems were often unstable in the sense that they required the presence of a battery and the solar panel to remain in equilibrium. If the battery was removed and the panel was in place, often times the device would tip over, resulting in damage to both the panel as well as other components.

Prior art devices also typically have a plurality of stands, clamps, nuts, bolts and the like, all of which are required to complete the assembly and many of which must be removed or loosened to enable disassembly to make the device portable.

SUMMARY OF THE INVENTION

An apparatus provided by the present invention is therefore configured to avoid the instability concerns of the prior art and also features a modular universal bar and clamping system for accommodating a range of solar PV module shapes, sizes and constructions or adding additional solar PV modules on either side. These solar PV modules can couple together so that they will rotate together into position, rather than requiring separate adjustments to each solar panel, thereby eliminating the need for additional clamps, brackets and the like.

Another feature of the present invention is a foot lock. The foot lock allows a solar panel to be rotated into the locked or travel position. It is designed to receive the end of the panel as it is rotated down, thereby being depressed through its motion and spring loaded so that it retains the solar panel in position. A simple stepping on the outer edge or lip of the foot lock depresses the lever away from the edge of the solar panel and allows it to rotate into position.

Another feature of the preferred embodiment of this invention is that the unit is designed to readily assemble, add structure for accessories (such as lighting and signage) and conversely break down into compact sub-assemblies for ease of shipment and transportation. The design accomplishes this as well as providing sufficient structural integrity to carry weights in excess of 180 lbs., using a minimum of material. The invention also encompasses a universal power cover that provides basic weather protection, versatility and functionality for a range of power electronic, monitoring and display devices. It does this with a simple cover and optional base plate arrangement.

In one aspect of the present invention, a portable apparatus for providing electrical power using solar power includes a base having a front pair of receptacles for receiving upright structures, said base supported by a pair of wheels connected by an axle therebetween, said pair of wheels disposed opposite said front pair of receptacles, said base including a spreader mounted thereto substantially perpendicular to said axle, a universal module bar assembly including a pair of upright structures extending from said front receptacles opposite said pair of wheels, said pair of upright structures connected by a cross-bar mounted distal to said front receptacles;

a solar panel rotatably mounted to said cross-bar by a solar module clamp, wherein said clamp is selectively adjustable to position said solar panel to an optimum solar angle; and a battery assembly including a battery and associated electronics, said battery assembly operatively connected to said solar panel, said electronics including an electrical output port for supplying electric power, whereby said battery assembly is mounted on said base such that removal thereof does not destabilize said portable solar powered unit.

Other objects, features, and advantages of the present invention will become more apparent in the light of the following detailed description of exemplary embodiments thereof, as illustrated in the accompanying drawings.

BRIEF DESCRIPTION OF THE DRAWINGS

FIG. 3b is an alternative stylized view of the solar powered unit of FIG. 3a.

FIG. 8b is an alternative view of the solar powered unit of FIG. 8a.

DETAILED DESCRIPTION OF THE PREFERRED EMBODIMENT

Figures 1, 2:
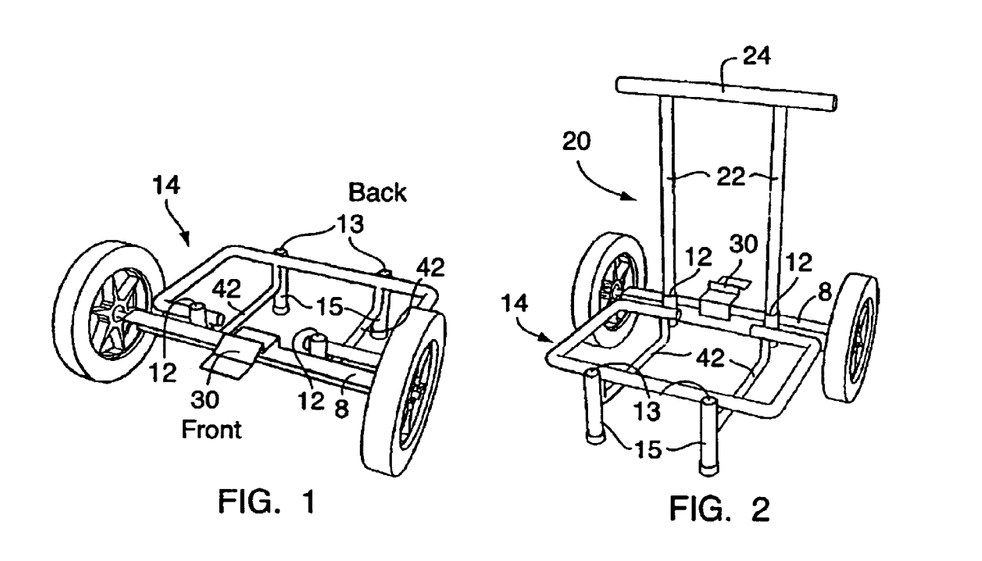
FIG. 1 is a stylized view of a base of the solar powered unit of the present invention.
FIG. 2 is a stylized view of the base with uprights of the solar powered unit of the present invention.

Referring to FIG. 1, in a preferred embodiment of the present invention, two pairs of receptacles, 12 and 13, are formed in a substantially rectangular base, 14. The base 14 forms an opening to an interior. Corresponding support structures 15, (or legs) extend downward from the receptacles, 12 and 13, to support the substantially rectangular base structure. Preferably there are both front and back receptacles (12 and 13 respectively), two on each side placed outside of the lower rail, which are then welded to the lower substantially tubular support structures that form the lower skeletal portion of the opening. The front receptacles 12 serve two purposes by providing a receptacle for inserting the universal module bar assembly 20 (see FIG. 2) and providing additional area with which to weld the lower tubular support structures 15, thereby increasing the strength of weld. This mandates that there be opposed complimentary receptacles welded in place in the preferred embodiment on the interior portion of the opposite side of that structure along the main sides or major dimensions that in this case serves three purposes: 1) a set of receptacles for a variety of accessories including a back rack or table top (see FIGS. 7, 3a, and 3b); 2) additional surface area with which to weld the lower tubular support (thereby increasing strength of weld); and 3) serving as hind legs to the side with wheels. Alternatively, the bottom support structures 15 can be run along the major dimensions of the structure or assembly, as opposed to the minor dimensions of the preferred embodiment.

Referring to FIG. 2, the universal module bar assembly 20 (as seen inserted into front receptacles 12 of base 14) includes two uprights 22, which extend from the front receptacles 12, and a crossbar 24 connecting the two uprights 22. It is preferable that the receptacles be placed outside the opening formed by the crossbar 24, although the alternative embodiments may be formed inside.

Referring to FIGS. 3a and 3b, 7, 8a and 8b, 9 and 10, the back receptacles 13 are adapted to receive a series of accessory support structures 26, which are configured to extend upward and outward and are otherwise adapted to receive a tray of other device, as depicted in the figures. The sizing of the receptacles 13 and the accessory support structures 26 and corresponding accessories are adapted to maintain the balance of the structure so as not to require a weight, such as the weight of the battery in order to be in equilibrium.

Figure 10:
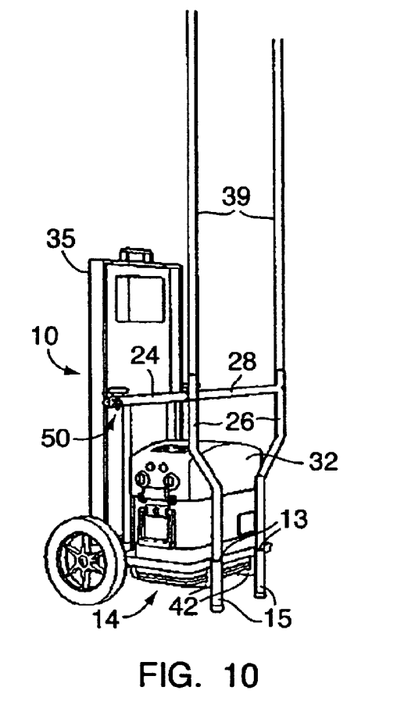
FIG. 10 is a stylized view of the solar powered unit of the present invention with dual mounting poles.

Referring still to FIG. 10, the rear set of accessory support structures 26 are adapted to receive the modular bar thereof 28, which is distal from the ends which are provided to the receptacles 13.

Returning to FIG. 2, and FIG. 3c, the upwardly extending uprights 22 are mated to a transverse crossbar 24 upon which one or more solar panels 35 may be mounted.

Figure 3A:
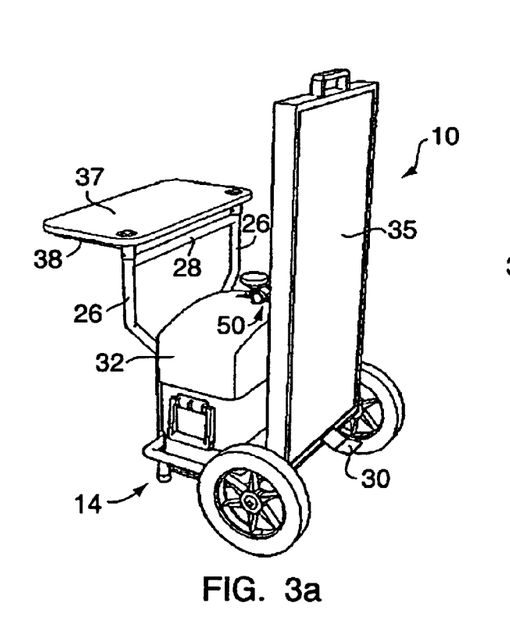
FIG. 3a is a stylized view of the solar powered unit of the present invention with a tabletop.
Figure 3B:
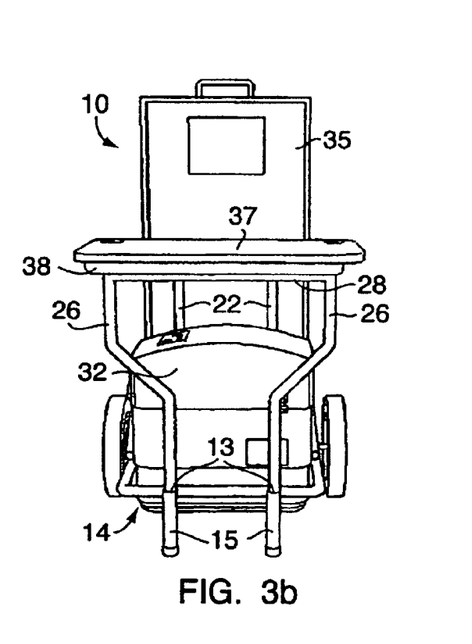
Figure 3C:
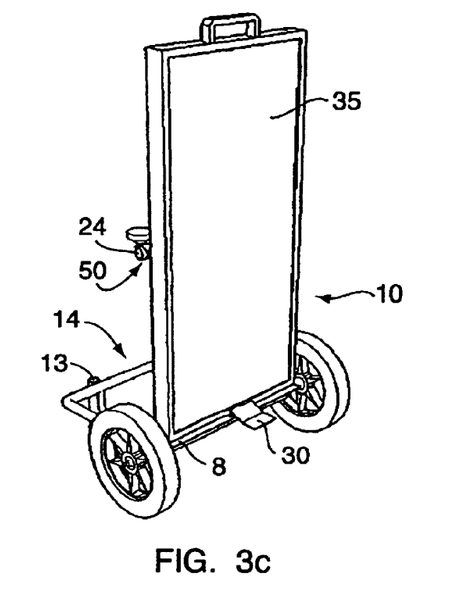
FIG. 3c is a stylized view of the solar powered unit of the present invention showing the solar panel in an upright position.

FIGS. 1–3 further illustrate the foot lock 30, disposed on the base 14, for selective engagement with the solar panel 35 when the solar panel 35 is oriented in an upright manner. The foot lock 30 is preferably made of steel stamping, although other equivalent structures could be substituted for either by stamping or molding in the case of original plastics.

Figure 4:
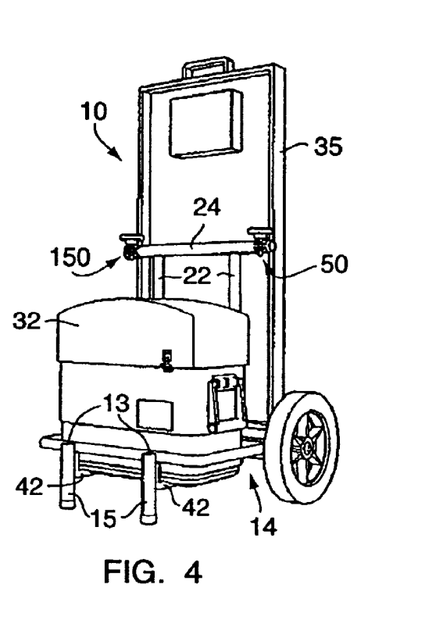
FIG. 4 is a stylized view of the basic solar powered unit of the present invention.

The portable solar powered unit, 10 including the base 14 frame, the uprights 22, the battery 32 and the solar panel 35 are illustrated in FIG. 4, according to one embodiment of the present invention.

Figures 5, 6:
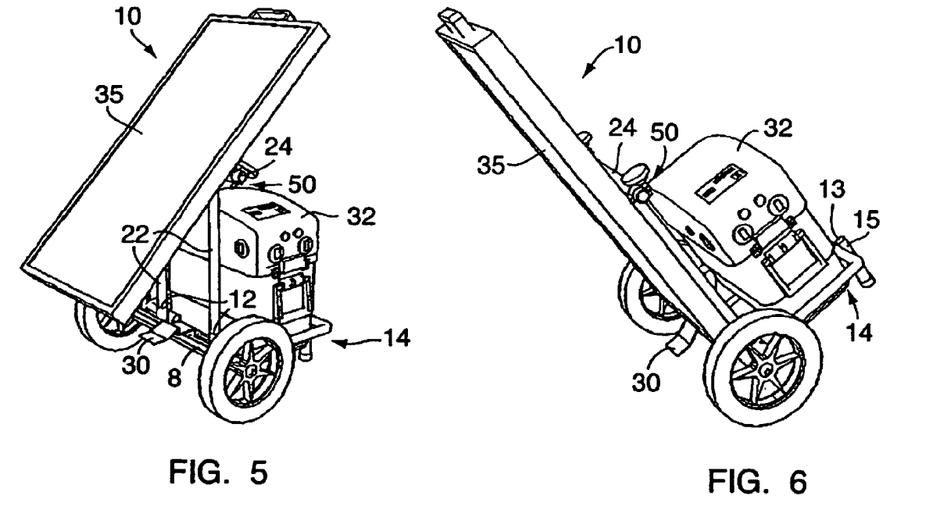
FIG. 5 is a stylized view of the basic solar powered unit of FIG. 4 in the sun-charging mode.
FIG. 6 is a stylized view of the basic solar powered unit of FIG. 4 in the travel or rolling mode.

FIG. 5 depicts the portable solar powered unit 10 of FIG. 4 wherein the solar panel 35 may be selectively positioned at a plurality of differing angles, while FIG. 6 illustrates a travelling position of the portable solar powered unit 10 with the solar panel 35 being locked in a secured position via the integrated foot lock 30, as is also illustrated in FIG. 3c.

Figure 7:
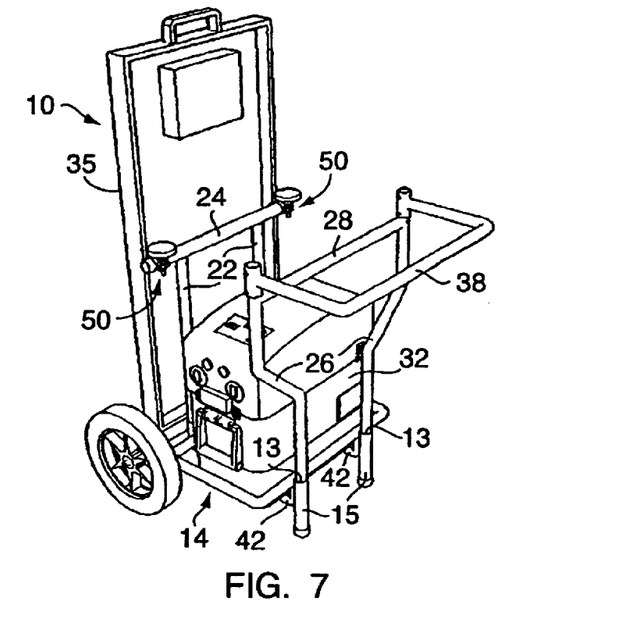
FIG. 7 is a stylized view of the solar powered unit of the present invention with a back rack.
Figure 8A:
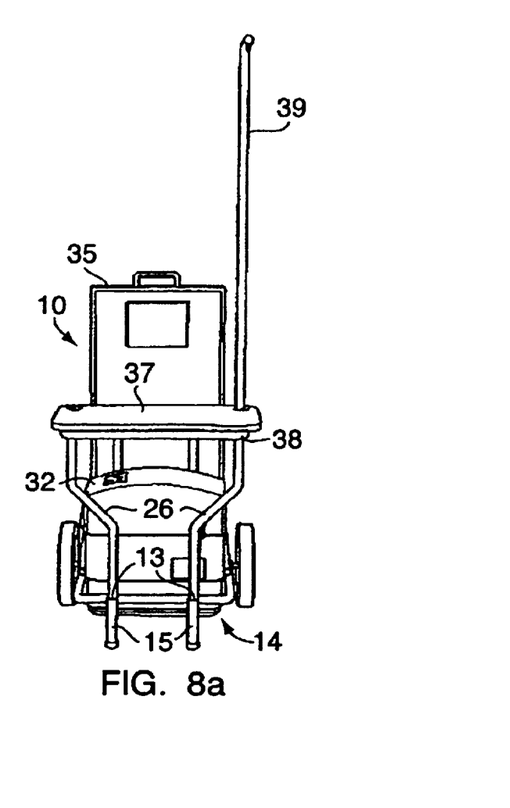
FIG. 8a is a stylized view of the solar powered unit of the present invention with a table and pole.
Figure 8B:
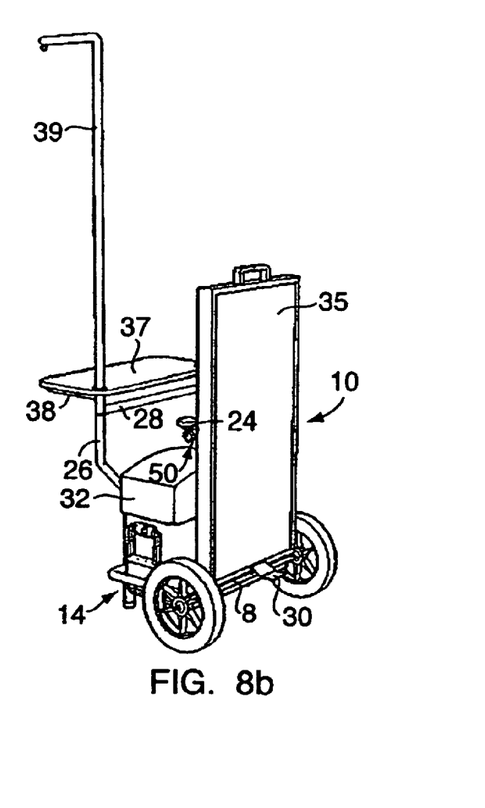
Figure 9:
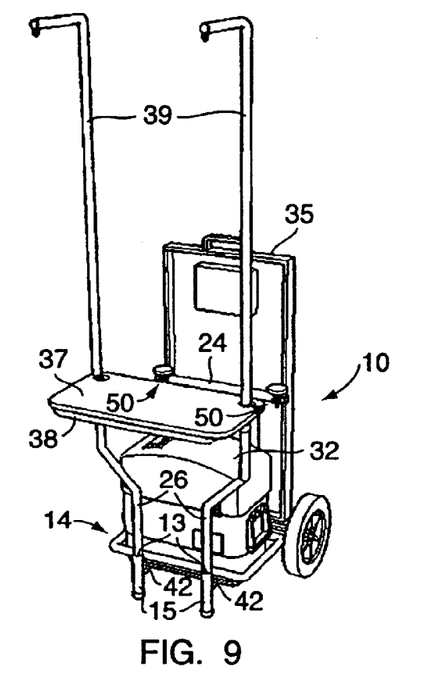
FIG. 9 is a stylized view of the solar powered unit of the present invention with a tabletop and dual overhangs.

FIGS. 7–11 depict differing embodiments of the present invention in which the portable solar powered unit 10 includes various utilitarian attachments. FIG. 7 depicts a back rack attachment 38, similar to the table top attachment 37 of FIGS. 3a and 3b, while FIG. 8 depicts views of a table 37 and overhang pole 39 attachment. FIG. 9 illustrates the portable solar powered unit 10 having dual overhang poles 39 and table top attachment 37, and FIG. 10 depicts matching mounting poles 36. It will be readily appreciated that the frame members of the various attachments shown in FIGS. 7–11 may be formed as structural members having a set length, or rather they may be formed as telescoping structural members capable of extending, or retracting, to any desired length.

Figure 11:
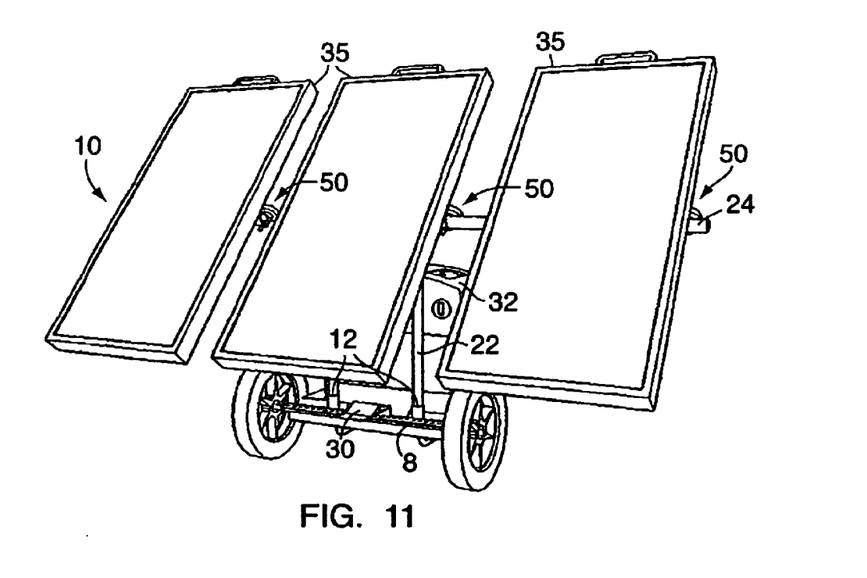
FIG. 11 is a stylized view of the solar powered unit of the present invention with three solar panels.
Figure 12A:
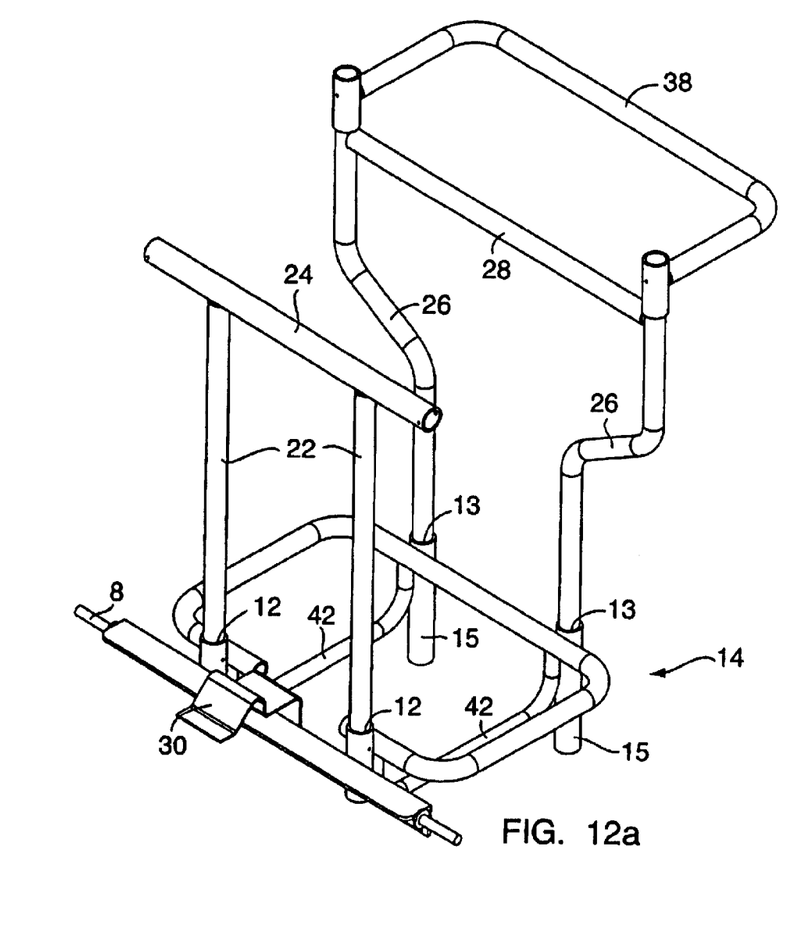
FIGS. 12a–12f are schematic views of the base frame and support structures of the solar powered unit of the present invention.
Figure 12B:
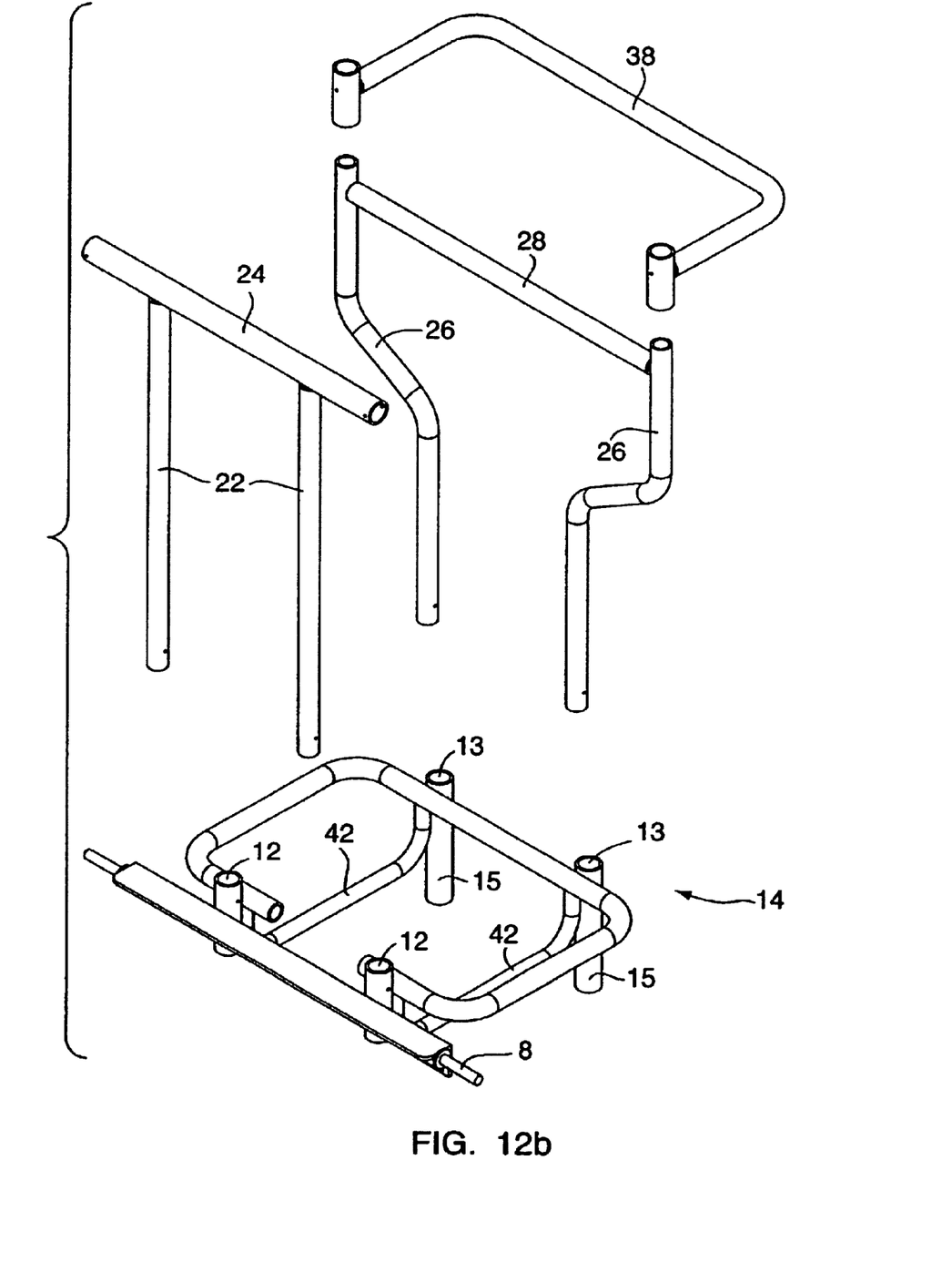
Figure 12C:
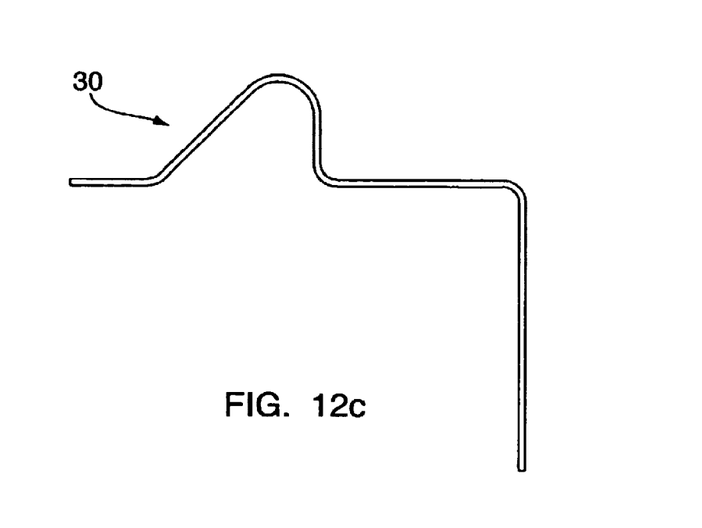
Figure 12D:
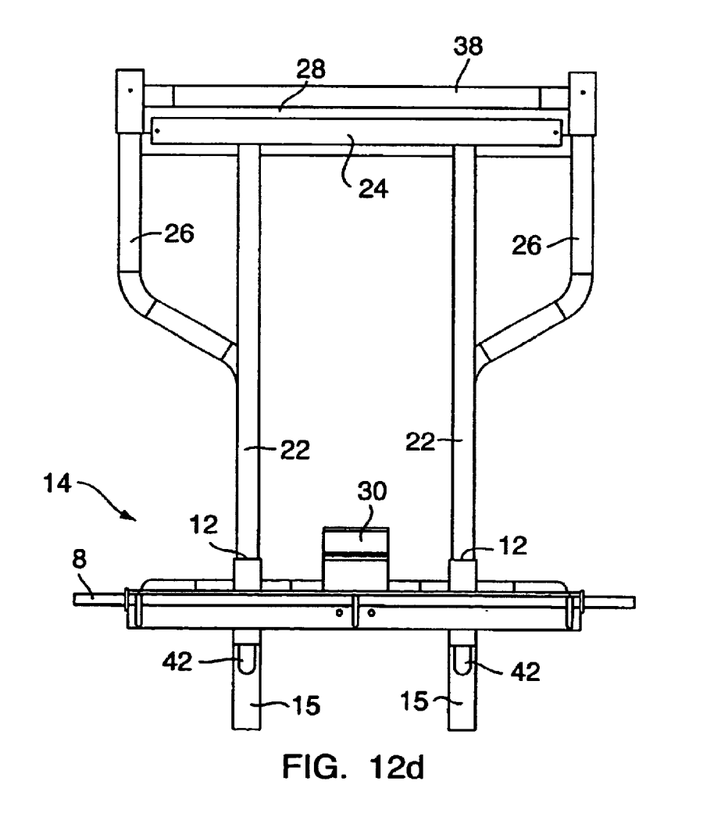
Figure 12E:
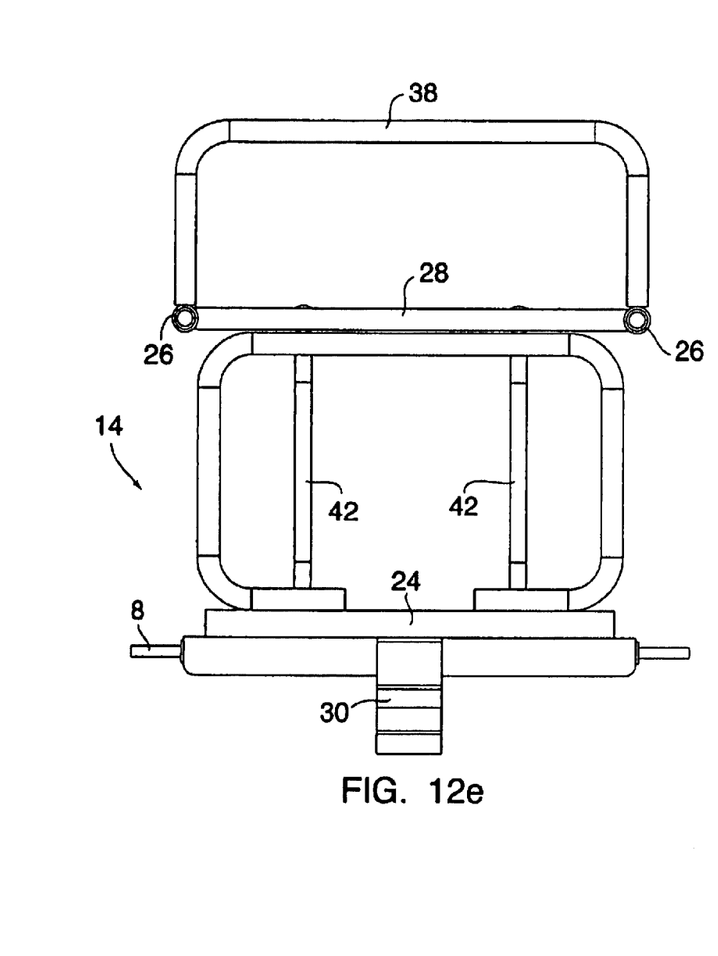
Figure 12F:
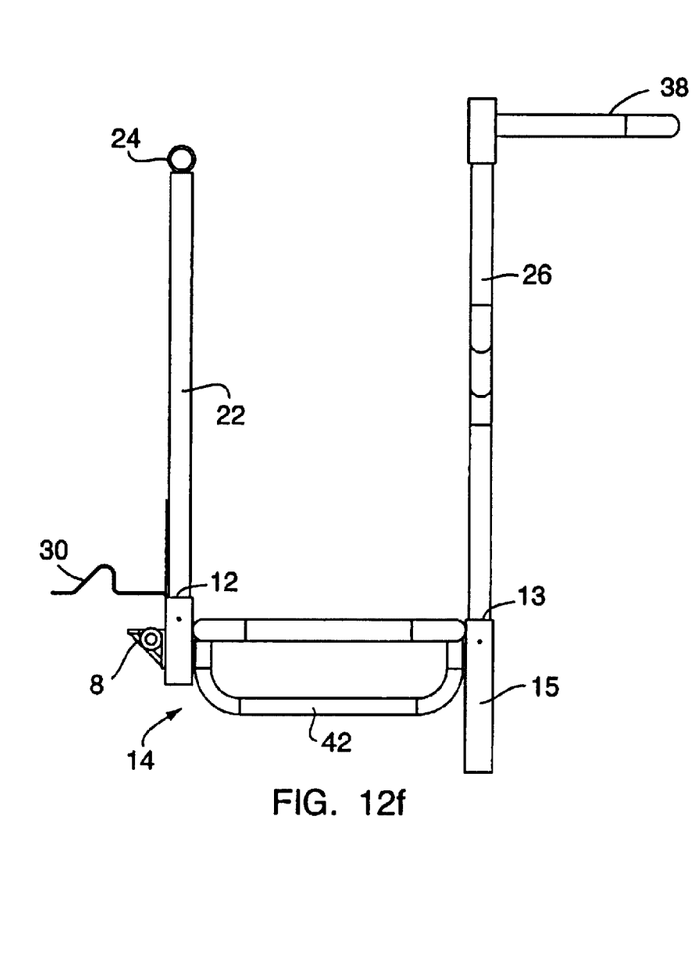
Figure 13:
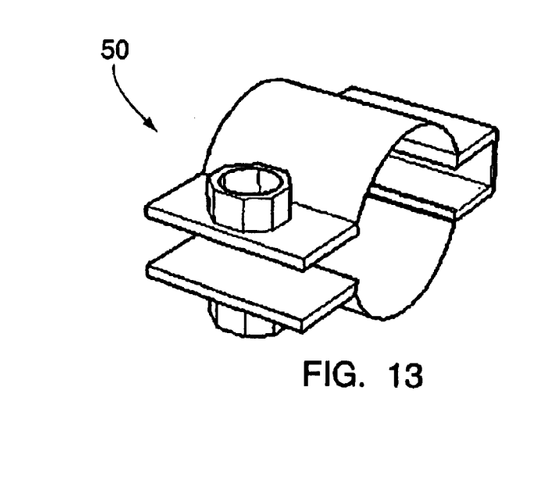
FIG. 13 is a stylized perspective view of the universal solar module clamp.
Figure 14A:
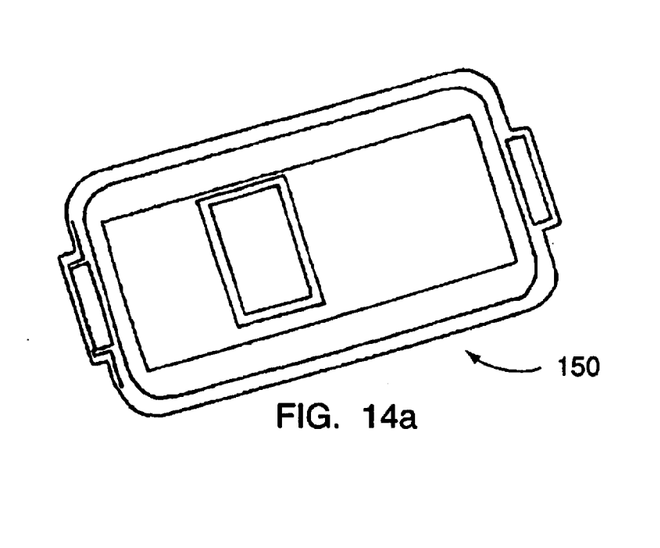
FIGS. 14a–14e are schematic views of the cover of the present invention.
Figure 14B:
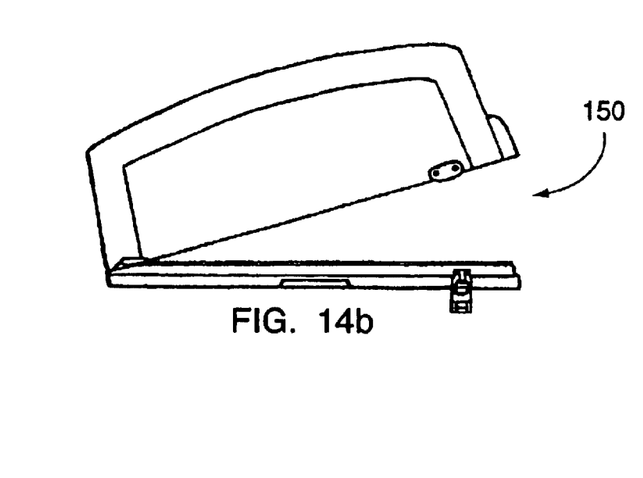
Figure 14C:
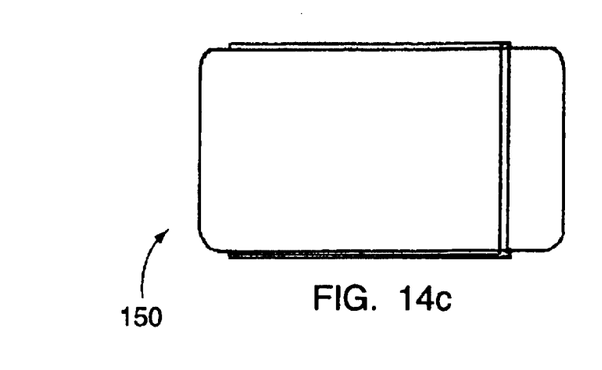
Figure 14D:
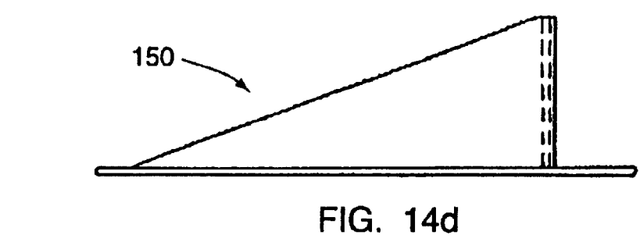
Figure 14E:
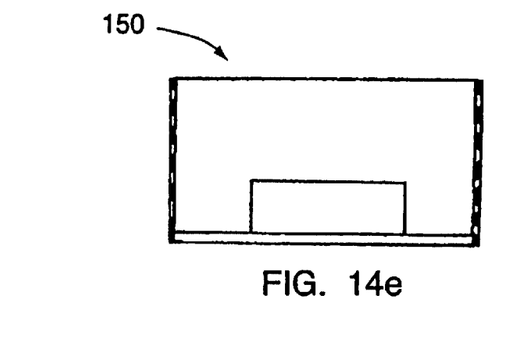

As seen in FIG. 11, the solar powered unit 10 of the present invention is capable of supporting a plurality of solar panels 35, or the like. As illustrated in FIG. 11, a first solar panel 35 may be attached to the horizontal cross-bar 24 via a universal solar module clamp 50 (see FIG. 13) which itself may be selectively loosened to permit the easy rotation of the solar panel to an optimum solar angle, and thereafter subsequently tightened. Additional solar panels may then be mounted adjacent the first solar panel, either by telescopically extending the existing horizontal cross-bar 24, or rather by inserting additional lengths of frame members into the distal ends of the horizontal cross-bar 24. It will be readily apparent that the frame members which may be inserted into the distal ends of the horizontal cross-bar 24 are arrested from rotation by any conventional means, such as but not limited to a lynch pin arrangement or the like.

It will also be readily appreciated that by allowing the two rear legs 13 of the solar powered unit 10 to act as receptors for a plurality of utilitarian attachments, as depicted in FIGS. 7–11, the solar powered unit of the present invention provides for great flexibility in structural configuration without impeding the ability of the solar powered unit to selectively position the solar panels mounted thereon.

Referring to FIG. 14, the present invention also includes a versatile, cost-effective weatherproof enclosure or cover 150 for the electronics of the solar powered unit whereby a hinging system 51 is utilized to tilt the single-piece cover 150 open to selectively expose the integral electrical ports. As shown in FIG. 14, the amount of the cover can open allows on sufficient access to appropriate AC electrical outputs, while preventing access to other components and aspects not intended for user access. The curved shape on both ends allows for cross ventilation of the power electronics contained within. Both, shapes have dual purposes. The left shape also provides a "stop" to limit the degree of cover opening, while the right shape is designed to provide a space for AC power chords to exit the cover.

Referring again to FIG. 1, another important aspect of the present invention is the orientation of the battery braces, or spreaders 42, to be substantially perpendicular to the axle 8 of the solar powered unit. By orienting the spreaders 42 in such a fashion, as opposed to being parallel to the axle 8, the forces generated by tilting the solar powered unit are transferred to the spreaders themselves, thereby significantly reducing the torsional stresses on the axle.

FIGS. 12a–12f and 13 are perspective views of the frame including the base 14, uprights 22, cross-bar 24, accessory support structures 26, and foot lock 30, of the solar powered unit, and universal solar module clamp 50.

While the invention has been described with reference to the preferred embodiments, it will be understood by those skilled in the art that various obvious changes may be made, and equivalents may be substituted for elements thereof, without departing from the essential scope of the present invention. Therefore, it is intended that the invention not be limited to the particular embodiments disclosed, but that the invention includes all embodiments falling within the scope of the appended claims.

What is claimed is:

1. A portable solar powered unit for supplying electric power comprising:
   a base adapted to support a battery assembly said base having a front receptacle for receiving an upright structure, said base supported by a wheel assembly disposed opposite said front receptacle, said base including a spreader mounted thereto,
   a universal module bar assembly including a pair of upright structures extending from said front receptacle opposite said wheel assembly, said pair of upright structures connected by a cross-bar mounted distal to said front receptacle,
   a solar panel movably mounted to said cross-bar by a solar module clamp, wherein said clamp is selectively adjustable to position said solar panel to an optimum angle for receiving solar energy, and
   a battery assembly including a battery and associated electronics, said battery assembly operatively connected to said solar panel, said electronics including an electrical output port for supplying electric power, whereby said battery assembly is mounted on said base such that removal thereof does not destabilize said portable solar powered unit.

2. The portable solar powered unit of claim 1 wherein said wheel assembly includes a pair of wheels.

3. The portable solar powered unit of claim 2 wherein said spreader is perpendicular to an axis between said pair of wheels.

4. The portable solar powered unit of claim 1 further comprising a rear receptacle for receiving an accessory support structure and
   a leg disposed opposite said rear receptacle for supporting said base.

5. The portable solar powered unit of claim 1 further comprising a foot lock disposed on said base for selective engagement with said solar panel to maintain said solar panel in a fixed position for travelling.

6. The portable solar powered unit of claim 5 wherein said foot lock is made of steel stamping.

7. The portable solar powered unit of claim 5 wherein said foot lock is spring loaded to an edge of said solar panel.

8. The portable solar powered unit of claim 1 wherein the cross-bar is extendable.

9. The portable solar powered unit of claim 6 further comprising a plurality of adjacent solar panels rotatably coupled together.

10. The portable solar powered unit of claim 1 further comprising a cover for said electronics, said cover adapted to selectively expose said electrical output port.

11. The portable solar powered unit of claim 10 wherein said cover is adapted to allow for cross ventilation of the electronics within.

12. The portable solar powered unit of claim 10 wherein said cover is a hinged unitary enclosure having a stop for limiting the degree of opening.

13. The portable solar powered unit of claim 4 further comprising an accessory support structure disposed in said rear receptacle and
   an accessory attached to said accessory support structure, said accessory including one of a table, a pole, a back rack, and an overhang.

* * * * *